(12) United States Patent
Arndt et al.

(10) Patent No.: US 6,642,999 B2
(45) Date of Patent: Nov. 4, 2003

(54) METHOD AND DEVICE FOR ANALYZING FLOWS

(75) Inventors: Stefan Arndt, Stuttgart (DE); Christian Heinen, Leinfelden-Echterdingen (DE); Klaus Reymann, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,196

(22) PCT Filed: Mar. 24, 2001

(86) PCT No.: PCT/DE01/01158

§ 371 (c)(1),
(2), (4) Date: Apr. 18, 2002

(87) PCT Pub. No.: WO01/79861

PCT Pub. Date: Oct. 25, 2001

(65) Prior Publication Data

US 2002/0135750 A1 Sep. 26, 2002

(30) Foreign Application Priority Data

Apr. 13, 2000  (DE) .......................................... 100 18 305

(51) Int. Cl.$^7$ .............................. G01P 3/36; G01F 1/00
(52) U.S. Cl. ........................................... 356/28; 73/861
(58) Field of Search ............................... 73/861; 356/28

(56) References Cited

U.S. PATENT DOCUMENTS

| | | | |
|---|---|---|---|
| 4,201,467 A | * | 5/1980 | Hartmann et al. |
| 4,804,263 A | * | 2/1989 | Schodl |
| 4,919,536 A | * | 4/1990 | Komine |
| 4,989,969 A | * | 2/1991 | Siebert et al. |
| 5,491,642 A | * | 2/1996 | Wormell et al. |
| 5,610,703 A | * | 3/1997 | Raffel et al. |
| 5,751,410 A | * | 5/1998 | Roehle et al. |
| 5,883,707 A | * | 3/1999 | Arndt et al. .................. 356/28 |

FOREIGN PATENT DOCUMENTS

| | | |
|---|---|---|
| DE | 195 02 993 | 8/1995 |
| DE | 197 37 933 | 3/1998 |
| DE | 199 63 393 | 7/2001 |

OTHER PUBLICATIONS

Ghamele et al. "A Method for Validating Two–Dimensional Flow Configurations in Paticle Streak Velocimetry", Transactions of the ASME, Journ. of Fluids Eng., Jun. 2000, ASME<USA, B . 122, NR. 2, pp. 438–440, XP000997966, ISSN: 0098–2202.*

Wung TS et al, "A Color–Coded Particle Tracking Velocimeter with Application to Natural Convention", Experiments in Fluids, Springer Publishers, Berlin, DT, vol. 13, Ser. No. 4, 1992, pp 217–223*.

* cited by examiner

Primary Examiner—Stephen C. Buczinski
(74) Attorney, Agent, or Firm—Kenyon & Kenyon

(57) ABSTRACT

A method and device for analyzing and quantifying flows for the three-dimensional determination of flow velocity components or the visualization of flows in fluids or gases. An illuminating device generates electromagnetic radiation of a predefined color to scan a detection space in the form of light planes arranged spatially one behind the other that are at least roughly parallel, and that are generated temporally one after the other. As a result, electromagnetic waves are generated in the detection space by particles characterizing the flow, and are detected using at least one image detector which records two-dimensional color images. The frequency, frequency spectrum, and/or intensity detected by at the least one of the image detectors is changed by an as a function of time.

24 Claims, 2 Drawing Sheets

METHOD AND DEVICE FOR ANALYZING FLOWS

FIELD OF THE INVENTION

The present invention relates to a method and a device for analyzing and quantifying flows, especially for the three-dimensional determination of flow velocity components or the three-dimensional visualization of flows in fluids or gases.

BACKGROUND INFORMATION

German Patent No. 199 63 393 concerns a method and a device for the three-dimensional determination of flow velocities in fluids or gases, whereby electromagnetic waves may be detected having been at least partially emitted or scattered from particles contained in a detection space and that may characterize the flow. For this purpose, in temporal succession, at least two approximately parallel light planes, arranged spatially one behind the other, may be generated using electromagnetic waves of a different frequency or a different frequency spectrum, the detection space being scanned by the waves. In addition, it was also proposed in that document, to record in a frequency-selective manner or a frequency-band-selective manner two-dimensional, especially color images of the scanned area of the detection space using a detection device, e.g. a CCD color camera.

It is an objective of the exemplary embodiment and/or exemplary method of the present invention to develop an alternative method and device that may be suitable for carrying out the method of German Patent No. 199 63 393.

SUMMARY OF THE INVENTION

The exemplary embodiment and/or exemplary method of the present invention may have the advantage of a reduced apparatus cost, and one less susceptible to fluctuations, in the area of the illumination device, while at the same time maintaining the advantages of the method of German Patent No. 199 63 393. For example, the data sets arising in the exemplary embodiment and/or exemplary method according to the present invention may be relatively small and therefore may be processed and evaluated easily and clearly. In addition, color modulation of the incident light beam or laser beam may be dispensed with, for example, using an acousto-optical modulator, by undertaking the color coding of the received two-dimensional images on the receiving side, i.e., in the area of the image detector.

Finally, the exemplary embodiment and/or exemplary method according to the present invention may have the advantage that, in comparison, for example, to methods which use high-speed camera systems, significantly reduced scattered light intensities may be sufficient.

Advantageously, there may be a multiplicity of possibilities to change, as a function of time, the frequency spectrum in response to scanning the detection space detected by the image detector(s) or the frequency detected by the image detector(s) or the intensity detected by them. In this context, it may be especially advantageous if, as the image detector, a CCD camera is used, which, for example, may have three sensors (chips) for three different colors, for example, red, green, and blue. By changing the exposure times applicable to the individual sensors in the CCD camera and/or by changing the sensitivity of these individual sensors, the image detected by this CCD camera may be easily changed as a function of time, whereby these changes may be synchronized in a simple manner by scanning the detection space using the light planes that may be arranged one behind the other and may be generated temporally one after the other. Similarly, it may be advantageous to install a rotating filter, for example, in front of each of these chips located in the CCD camera, so as to change as a function of time, in a defined and periodic manner, the intensity detected by these chips.

Furthermore, in place of a CCD color camera it may also be advantageous to use a black/white camera, which may have in its interior, for example, three sensors, whose sensitivity to the intensity of the incident electromagnetic radiation may be changed, in each case separately, as a function of time, so that the sensors each may have assigned to them a false color, for example, red, green, and blue. In this way a color image of the detection space may be obtained from the images recorded by the individual sensors as a function of time, using superposition, for example, carried out in a computer.

In this manner, the two-dimensional image of the detection space finally registered by the image detector may be furnished with color information, which may clearly correlated with the location and time of the generation of a light plane in the detection space and therefore of the y-coordinate of the location of a light-scattering or -emitting particle.

In addition, the image detector(s), during the scanning of the detection space, may be adjusted continuously or step-by-step in their depth of focus, so that in each case an image may be formed of the individual light planes at the location of the image detector at least fairly precisely.

DETAILED DESCRIPTION

Figure 1:
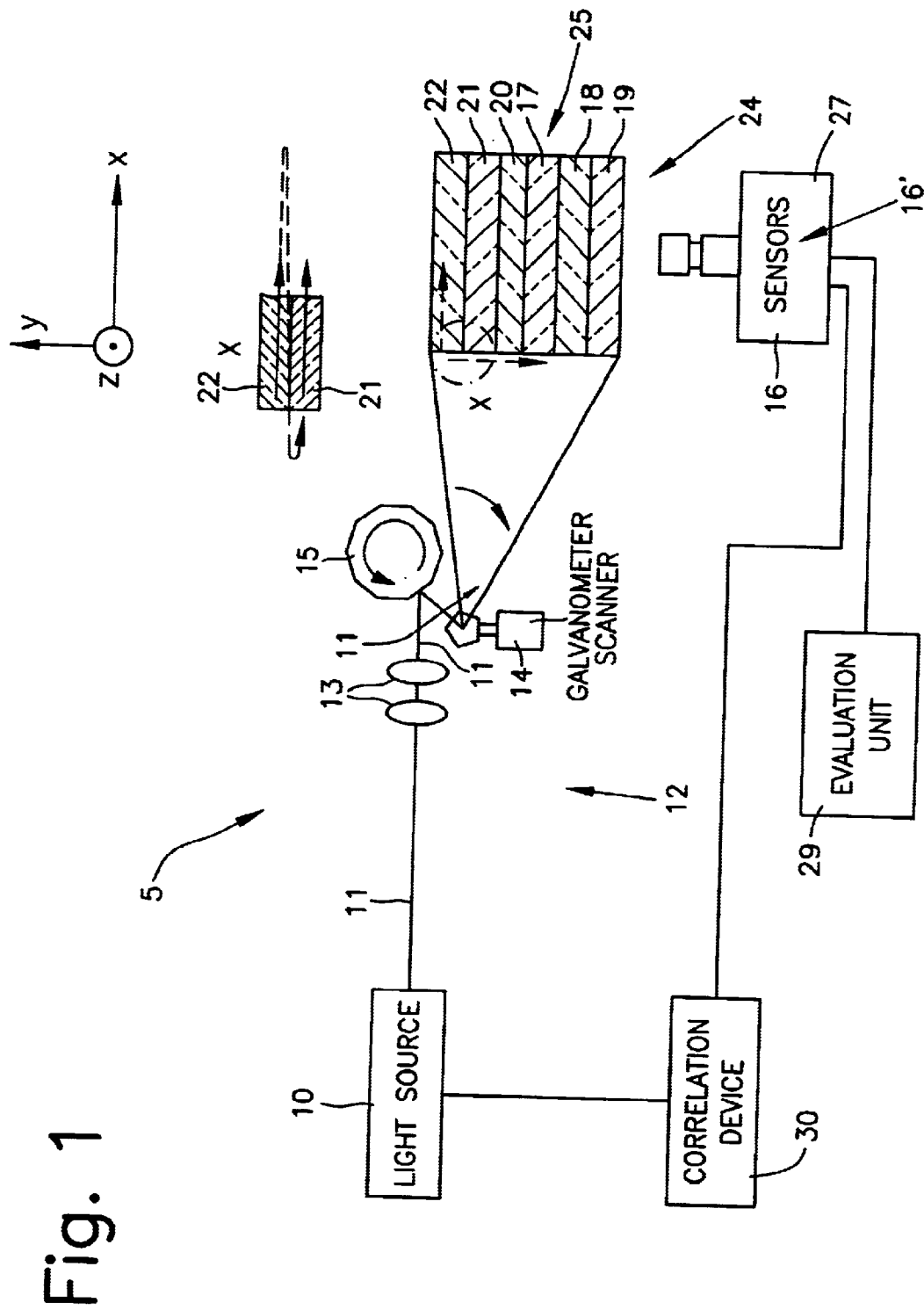
FIG. 1 shows a flow analysis device.

According to one exemplary embodiment and/or exemplary method of the present invention, an illuminating device first generates electromagnetic radiation which scans, at least sectionally or in parts, a detection space. Then electromagnetic waves, which may at least partially be emitted or scattered from particles contained in the detection space and which may characterize the flow to be analyzed, may be detected using at least one image detector.

In this context, a suitable electromagnetic radiation may be, for example, a monochromatic electromagnetic radiation or an electromagnetic radiation having a plurality of frequencies or having a preestablished frequency spectrum, e.g., of a predefined color. The electromagnetic radiation used may be located in the visible frequency range. Any electromagnetic radiation may be used if suitable image detectors are available. For example, IR radiation or UV radiation may also be used.

The illuminating device thus may first generate light planes, that may be at least roughly parallel and arranged spatially and temporally one after the other, and that may scan or raster-scan the detection space or one sectional area of the detection space. However, in this context, a color modulation of the light beam or laser beam produced by the illuminating device may be dispensed with, and a color coding of the two-dimensional images recorded by the image detector may be carried out on the receiving side.

Therefore, single-color or monochromatic light planes may be generated that may be at least roughly parallel, which, spatially and temporally arranged one behind the other, may scan or raster-scan a detection space. During this scanning process, an image of the detection space may be recorded by one or more image detectors, for example, by a 3-chip-CCD color camera arranged on the end face of the detection space. In this context, to determine, in the normal direction, i.e., in the y-direction, the positions and therefore the velocities of the particles characterizing the flow to be investigated, color codings may be undertaken simultaneously with the scanning as a function of the temporally and spatially changing position of the light planes during the image detection.

Specifically, this may occur, for example, as a result of the detection volume recorded using a 3-chip CCD color camera, in which each particle generating a scattered light signal may be recorded on each of the three sensors or chips of this camera, which may represent the primary colors, red, green, and blue. In 3-chip CCD color cameras, this may take place, for example, as a result of a frequency-selective or frequency-band-selective filter arranged in front of each chip. However, alternatively, it may also be possible to provide a CCD camera with, for example, three black/white chips (b/w sensor), which record as a function of time only the intensities that impinge on them, and from whose images a color image may be subsequently produced, the gray-scale signals of the individual sensors, for example, being assigned to the colors of an RGB monitor (red/green/blue). To this extent, each of these b/w sensors may represents a defined color of an RGB image, which subsequently may be generated in false colors, for example, in a computer.

If the sensitivity of the individual sensors or chips in the camera is varied as a function of the position of the light plane, the particles characterizing the flow may be represented in a mixed color as a function of the proportions of the intensities of the colors, red, green, and blue, in the summation image of the three images of the individual sensors, the mixed color being linked in a clear manner to a concrete light plane, i.e., a defined y-coordinate of the location of the particle.

In this context, on the one hand, it may be possible to understand the sensitivity to be varied as the integral sensitivity of a sensor, i.e., its signal as a function of the intensity of the light incident on the sensor or of the electromagnetic radiation incident on the sensor. On the other hand, it may be understood as the spectral sensitivity of the sensor for a defined frequency or a defined frequency spectrum of the electromagnetic radiation incident on the sensor, i.e., its signal as a function of the frequency.

The described intensity change of the intensity incident on the individual sensors may be further realized by at least one rotating gray filter, which may be positioned in front of at least one of the individual sensors or chips in the CCD camera. As an alternative to rotating gray filters, rotating color filters or rotating polarization filters having a front-positioned polarizer may also be used. Furthermore, there may also exist the possibility of an electronic change of the intensities or frequency spectra or frequencies detected by the individual sensors or chips of the CCD camera, so that in this manner in a two-dimensional, e.g. color image, recorded by the CCD camera, color codings of the individual scattered light signals may arise, which may be clearly assigned to a specific light plane.

Finally, three different CCD cameras may be used, each of which may be provided with a suitable device for the time-dependant modulation of the detected intensities or the detected frequency spectrum or the detected frequency. In this case, it may be necessary that each of the three cameras detects the same image segment, i.e., records the same area of the detection space, which may be realized, for example, by using a beam splitter for dividing the intensity incident on the cameras used. In the event that three CCD cameras are used, which in their interiors each may have three sensors (chips), which may be sensitive to the primary colors, red, green, and blue, or which may represent them, it may then be provided, by way of example, as was already described above, that rotating gray filters may be installed in front of some of the sensors of the CCD camera.

Furthermore, in response to raster-scanning the detection space by the parallel light planes at the location of the image detector(s), the exemplary embodiments and/or exemplary methods of the present invention may provide an assurance of an at least substantially uniformly good depth of focus. For this purpose, the image detector may be equipped in each case with an additional device for the continuous or step-by-step adjustment of the depth of focus as a function of the location of the light plane during scanning of the detection space.

Overall, therefore, for realizing a rapid color change or a rapid-color coding of the two-dimensional-images received by the image detector, on the one hand, rotating color or gray filters or a general filter, which change their transmission as a function of time, may be used and may be installed in front of the image detector(s). On the other hand, in CCD cameras having, for example, three sensors (chips), a high frequency multiple illumination of these individual sensors may be provided, where, varying intensities are generated on the individual sensors through varyingly long exposure times or varyingly long exposure pauses.

In this way, longer exposure times on one of these sensors may lead to a greater image intensity of the individual image of this sensor, which ultimately, due to the differing intensity contributions of the individual images and/or of the individual colors, for example, red, green, and blue, assigned in each case to a sensor, may result in a defined color coding of the summation image of the three sensors in the CCD camera, i.e., the superposition or addition of the images of the individual sensors. The high-frequency multiple exposure, in this context, may extend into the MHZ range.

In addition to the aforementioned high-frequency multiple exposure of one or more sensors, may use a time-dependent, for example, electronic modulation of the spectral sensitivity or of the integral sensitivity over the entire detected frequency spectrum.

In this way, an individual sensor in the CCD camera, for example within one record of a two-dimensional image, may change its spectral or integral sensitivity such that different intensity contributions of the individual sensors in the CCD camera may be realized as a function of time and therefore of the position of the light planes in the normal direction within one record. In the summation image, stored by the CCD camera, of the images of the individual sensors, this may result in a color coding of the normal direction, i.e., of the y-coordinate, of the particles characterizing the flow as a function of time or of the location of the light plane generated at this time in the detection space.

Furthermore, the exemplary method described above for color coding may also be used in combination.

FIG. 1 depicts a flow analyzing device 5 (see German Patent No. 199 63 393), having an illumination device 12, which may be constituted by a light source 10, e.g. a monochromatic, white, or color laser beam, a downstream collimator 13, a polygon scanner 15, and a galvanometer scanner 14. Using this illuminating device 12, a light beam 11 may be first generated, which raster-scans a detection space 25 in the form of same-color light planes 17, 18, 19, 20, 21, 22, generated temporally one after the other, arranged spatially one after the other, and at least roughly parallel. On one end face 24 of detection space 25, an image detector 16 is arranged in the form of a CCD camera, which in its interior has three sensors 16'. These sensors 16' are represented in image detector 16, for example, in the form of chips, which are sensitive to the colors red, green, and blue. The two-dimensional image, provided by image detector 16 or stored temporarily, may therefore be a summation of the images of sensors 16' and therefore may be, for example, colored. Alternatively, three sensors 16' in the CCD camera may also each be b/w sensors (black/white), whose gray-scale signals may then each be assigned to one color, so that in this way also a two-dimensional color may image arise, for example, by assigning these three b/w sensors to the R-, G- and B-terminals of an RGB color monitor (red/green/blue).

In image detector 16, an electronic control unit 27 may also be integrated, by which the exposure times arising on individual sensors 16' and/or the sensitivities arising on individual sensors 16' for the specific frequency ranges of these sensors 16' may be changed. It may also be provided that image detector 16 be connected to an evaluation unit 29, for example, a computer, which stores the two-dimensional color images recorded by image detector 16. An evaluation unit 29 may also be provided for evaluating the recorded two-dimensional images of detection space 25 using "particles tracking" algorithms or correlation methods, this evaluation taking place by including the spectral composition of the recorded images. In this manner, using an evaluation unit 29, the location of the particles in the scanned area of three-dimensional detection space 25 as well as their spatial shift as a function of time may be determined from the recorded two-dimensional images. Taking into account the time duration between the individual scanning processes of detection space 25, a scanning process being understood as a one-time, complete raster-scanning of detection space 25 using light planes 17, 18, 19, 20, 21, and 22, the local flow velocities of the individual particles characterizing the flow may therefore now be determined. In this context, the x- and z-components of the local flow velocities may be generated directly from the spatial shift of this particle in the xz plane, whereas the y-component of the local flow velocities of this particle may be determined from the color information generated in the aforementioned manner or from the color coding undertaken of the recorded images.

In FIG. 1, it may also be provided that image detector 16 be connected to illuminating device 12, for example, to light source 10, via a correlation unit 30. This correlation unit 30 assures, on the one hand, that the temporal change of the detected frequency spectrum, or of the detected frequency and/or of the detected intensity, may take place in a periodic manner in detector 16, and that at the same time this periodic change may be correlated or synchronized with the periodic scanning of detection space 25 by light planes 17, 18, 19, 20, 21, 22. In this context, the scanning period of detection space 25 by light planes 17, 18, 19, 20, 21, 22 may be preferably equal to the period of the temporal change of the detected frequency spectrum or of the detected frequency and/or of the detected intensity of image detector 16. In addition, the scanning period may also be a whole-number multiple of this period.

Figure 2:
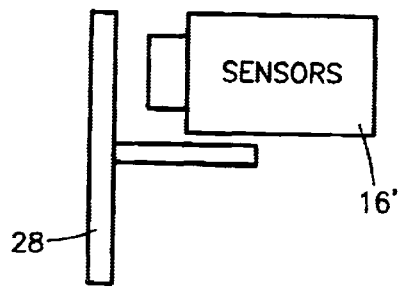
FIG. 2 shows a sensor having a front-positioned rotating filter in a side view.

FIG. 2 explains, by way of example, the manner in which at least one of three sensors 16', which may be integrated in image detector 16, may be provided with a rotating gray filter 28. In this context, the rotation of this gray filter 28 may be correlated via correlation unit 30 with the scanning of detection space 25, such that the intensity, incident on sensor 16' as a function of time, of the electromagnetic waves emitted or scattered from the particles contained in detection space 25 and characterizing the flow may be unambiguously assigned to one defined light planes 17, 18, 19, 20, 21, or 22. Overall, it may be achieved as a result of rotating gray filter 28 that the two-dimensional image recorded by image detector 16 during the raster-scanning of detection space 25 may be changed in its spectral composition and therefore in its color, in that, on the basis of rotating gray filter 28, the contribution of one of sensors 16' to the recorded image may be modulated by the intensity change registered by the sensor. The recorded two-dimensional image, in this context, may be the summation of individual images of sensors 16' that are integrated in image detector 16. To realize the intensity change in sensors 16' using rotating gray filter 28, the latter may also be configured such that, at a constant intensity of the electromagnetic waves impinging on rotating gray filter 28, the intensity detected by sensor 16' undergoes a periodic modulation corresponding to the rotation of gray filter 28. In this context, the period of the intensity modulation in sensor 16' may preferably correspond to one complete rotation of gray filter 28.

Figure 3:
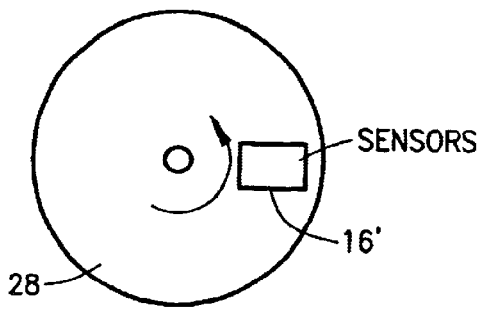
FIG. 3 shows the sensor having a front-positioned filter of FIG. 2 in a top view.

The rotational frequency of gray filter 28, of FIG. 2, may amount, for example, to 20 kHz and may also, for example, be equal to the scanning frequency of detection space 25 by light planes 17, 18, 19, 20, 21, 22, generated in the manner described. In this context, the scanning frequency used may also be adjusted to the flow velocities to be measured. FIG. 3 depicts FIG. 2 in a top view.

Figure 4:
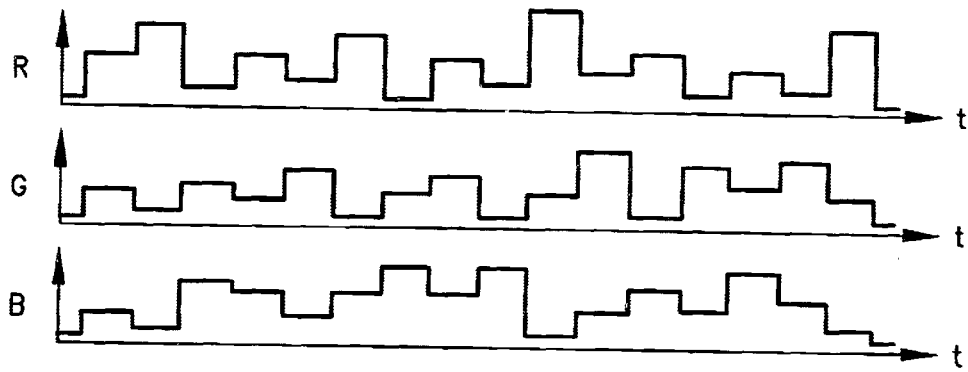
FIG. 4 shows a time-dependent variation of the spectral sensitivity of three sensors in a CCD camera for the colors red, green, and blue.

FIG. 4 describes an alternative exemplary method to FIGS. 2 and 3 for the temporal change of the frequency spectrum detected by image detector 16 or of the intensity detected by it. According to FIG. 4, in this context, it may be first once again provided that image detector 16 be implemented in the form of a CCD camera, in whose interior three sensors 16' may be located, which may be sensitive to the colors red, green, and blue, or which may represent them as b/w sensors. It may also be provided that image detector 16 has an electronic control unit 27, which may carry out separately for each sensor 16' a time-dependent variation of the intensity sensitivity of this sensor 16'. This time-dependent variation of the sensitivity of individual sensors 16' is depicted in FIG. 4 for the colors, red, green, and blue.

On the basis of this variation, the result in the summation image of the individual images of individual sensors 16', which may be registered by image detector 16 in the form of a two-dimensional color image, may be a defined color coding of the particles contained in detection space 25 and characterizing the flow. In this context, the color coding contains the information concerning the location of these particles in the y-direction. In this manner, it may be possible especially within one record, i.e., by recording one single two-dimensional color image of the investigated area of detection space 25, to ascertain the motion of a particle both in the xz plane as well as in the y-direction, which is perpendicular to the former.

Figure 5:
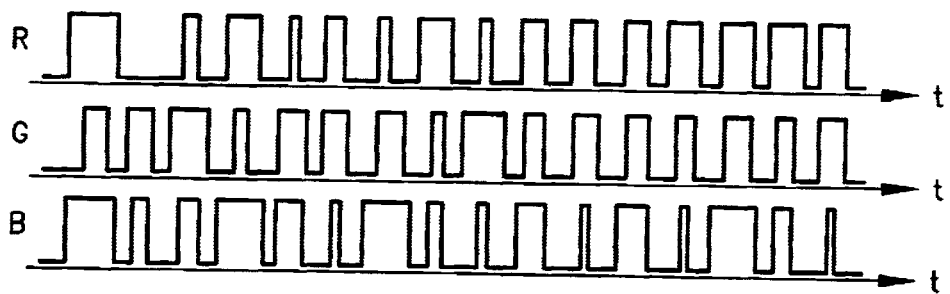
FIG. 5 shows a representation of a color pattern sequence using different exposure times of three sensors in a CCD camera for the colors, red, green, and blue.

FIG. 5 describes a exemplary method as an alternative to FIG. 4 for color coding, in contrast to FIG. 4. it being not a modulation of the sensitivity of individual sensors 16' that may be undertaken, but rather a change of the exposure times applicable to individual sensors 16' or chips. In this context, the exposure times may be carried out by a phase modulation and/or a pulse-width modulation of the drive of individual sensors 16' using electronic control unit 27. This phase- or pulse-width modulation may be simultaneously synchronized, via correlation unit 30, with the scanning of detection space 25 by light planes 17, 18, 19, 20, 21, 22.

With respect to further details for evaluating the two-dimensional color images of detection space 25 recorded by image detector 16, reference may be made to the German Patent No. 199 63 393. The evaluating methods described there may also be used in connection with the exemplary embodiments and/or exemplary methods described above.

The flow velocities of the particles in detection space 25 may also be determined using the method of German Patent No. 199 63 393.

In this connection, it may also be emphasized either that a two-dimensional color image may be recorded by image detector 16 for each scanning process of detection space 25, the image being correlated then with a two-dimensional image of detection space 25 recorded for example shortly thereafter, or that alternatively, in a two-dimensional color image of detection space 25, a plurality of probing processes may be measured, so that the motion of a particle in detection space 25 may be yielded directly, as a pointwise track, of optionally differently colored scattered-light points in this two-dimensional color image.

Again, as an alternative to a CCD camera, the imaging of the flow space or of the detection space 25 may also be carried out using a 3-chip special camera, for example, a so-called LLT3 camera. In this case, within this camera three sensors 16' may be used in the form of black/white sensors, which may represent the colors, red, green, and blue of an RGB image. In evaluation unit 29, the individual colors, through the superposition of the partial images of sensors 16', may then be reconstructed from the ratio of the intensities of the gray-scale partial images of the individual sensors, and may be depicted in false colors. Therefore, a color coding of the finally received images of detection space 25 may be possible using an-LLT3 camera of this type on the basis of the sensitivity or the exposure times incident on the individual sensors 16'.

Detection space 25 in the example discussed may have dimensions of 10 cm×10 cm×10 cm. The number of light planes 17, 18, 19, 20, 21, 22, arranged one behind the other, may amount to at least three, but there may be a multiplicity of, for example, 100 to 200 light planes. In addition, in place of polygon scanner 15 in illuminating device 12, one or more known cylinder lenses may be used. Polygon scanner 15 may preferably rotate in accordance with the measuring task, 20,000 to 60,000 r/min, for example, 40,000 rotations per minute. The scanning velocity, however, may also be raised into the MHZ range, if appropriate, using further optical components. The size of the particles contained in the detection space may be in the order of magnitude of 1 μm to 60 μm.

What is claimed is:

1. A method for analyzing a flow in at least one of a fluid and a gas for providing at least one of a three-dimensional determination of velocity components of the flow and a three-dimensional visualization of the flow, the method comprising:

arranging spatially one after another in a detection space at least two roughly parallel light planes, and generating temporally the at least two roughly parallel light planes one after another using electromagnetic radiation of a predefined color; and scanning the detection space using the at least two roughly parallel light planes, and detecting electromagnetic waves that are at least one of partially emitted and scattered by particles that are contained in the detection space and that characterize the flow using at least one image detector, wherein in the step of scanning, changing as a function of time at least one of a frequency, a frequency spectrum and an intensity detected by at least one of the at least one image detector of the electromagnetic waves that are at least one of partially emitted and scattered by the particles.

2. The method of claim 1, wherein in the step of scanning, at least one of (i) a spectral composition in images of at least one area of the detection space recorded one after another by at least one of the at least one image detector, and (ii) a spectral composition within one image of at least one area of the detection space recorded by at least one of the at least one image detector is changed as a function of time.

3. The method of claim 2, wherein in the step of scanning, at least one of (i) a spectral sensitivity of at least one of the at least one image detector, (ii) an intensity impinging on at least one of the at least one image detector, and (iii) a duration of the electromagnetic waves impinging on at least one of the at least one image detector is changed as a function of time at least one of within one recorded image and between recorded images.

4. The method of claim 1, wherein at least one image detector includes at least one CCD camera.

5. The method of claim 1, wherein the electromagnetic radiation of a predetermined color includes at least one of a color laser beam and a monochromatic laser beam.

6. The method of claim 1, wherein the electromagnetic radiation of a predetermined color is generated in one of a pulse-wave mode and a continuous wave mode.

7. The method of claim 1, wherein the at least two roughly parallel light planes, which are generated temporally one after another and arranged spatially one after another, scan the detection space such that the at least one image detector detects an illumination of the detection space that is at least roughly continuous temporally.

8. The method of claim 1, wherein a depth of focus of at least one of the at least one image detector, during the scanning of the detection space, is adjusted one of continuously and step-by-step, so that the at least two roughly parallel light planes, which are arranged spatially one after another and generated temporally one after another, are imaged at least fairly sharply at a location of the at least one image detector.

9. The method of claim 1, wherein:

at least two scannings of the detection space immediately follow one another and take place in a short time interval so as to provide a multiplicity of periodic scannings;

a two-dimensional image of the detection space is recorded using the at least one image detector; and at least one of emitted light and scattered light from the particles is measured in the at least two scannings of the detection space.

10. The method of claim 1, wherein two-dimensional images of the detection space are recorded using the at least one image detector, and measuring at least one of emitted light and scattered from the particles in at least two images recorded shortly after one another.

11. The method of claim 1, the step of scanning includes evaluating at least one two-dimensional recorded image of the detection space using at least one of a particle tracking algorithm and a correlation method based on a spectral composition of the recorded images, and determining at least one of a location of the particles in a scanned area of a three-dimensional detection space and a spatial shift of the particles as a function of time from the at least one two-dimensional recorded image.

12. The method of claim 10, wherein local flow velocities of individual particles are determined based on a time duration between scannings.

13. The method of claim 1, wherein a temporal change of at least one of a detected frequency, a detected frequency spectrum and a detected intensity occurs periodically.

14. The method of claim 1, wherein a temporal change of at least one of a detected frequency, a detected frequency spectrum and a detected intensity is one of correlated and synchronized with a periodic scanning of the detection space in at least one of images recorded one after another by at least one of the at least one image detector and within one image recorded by at least one of the at least one image detector, and a scanning period is one of equal to and a whole number multiple of a period of the temporal change of the at least one of the detected frequency, the detected frequency spectrum and the detected intensity.

15. A device for analyzing a flow in at least one of a fluid and a gas for providing at least one of a three-dimensional determination of velocity components of the flow and a three-dimensional visualization of the flow, the device comprising:

a first arrangement to arrange spatially one after another in a detection space at least two roughly parallel light planes, and to generate temporally the at least two roughly parallel light planes one after another using electromagnetic radiation having at least one of a predefined frequency, a predefined frequency spectrum and a predefined color, the first arrangement including an illuminating device;

a second arrangement to scan at least regions of the detection space using the at least two roughly parallel light planes, and to detect electromagnetic waves that are at least one of partially emitted and scattered by particles that are contained in the detection space and that characterize the flow, the second arrangement including at least one image detector; and a third arrangement to change as a function of time at least one of a frequency, a frequency spectrum and an intensity detected by at least one of the at least one image detector of the electromagnetic waves that are at least one of partially emitted and scattered by the particles.

16. The device of claim 15, wherein the illuminating device includes at least one of a light source, a laser, a collimator, a polygon scanner, and a galvanometer scanner.

17. The device of claim 15, wherein the at least one image detector is arranged on at least one end face of the detection space, the at least one end face being parallel to the at least two roughly parallel light planes.

18. The device of claim 15, wherein the at least one image detector includes at least one of a black/white camera, a color camera, a CCD camera and a 3-chip camera to at least one of record and depict in false colors two-dimensional images of at least one area of the detection space.

19. The device of claim 15 wherein the at least one image detector includes a device for adjusting a focus depth.

20. The device of claim 15, wherein the device includes at least one of an evaluation unit and a computer to at least one of evaluate and store recorded two-dimensional images.

21. The device of claim 15, wherein the device includes a correlation unit to at least one of correlate and synchronize a temporal change of at least one of a detected frequency, a detected frequency spectrum and a detected intensity based on a scanning of the detection space by the illuminating device.

22. The device of claim 15, wherein:

the at least one image detector includes a CCD camera having three sensor chips to detect at least one of three different colors and three different frequency ranges; and the third arrangement includes an electronic control unit integrated in the CCD camera, the electronic control unit being operable to selectively change as a function of time at least one of a spectral sensitivity of at least one of the three sensor chips, an integral sensitivity of at least one of the three sensor chips and an intensity impinging on at least one of the three sensor chips.

23. The device of claim 15, wherein:

the at least one image detector includes at least three CCD cameras to detect an identical area of the detection space; and the third arrangement includes an electronic control unit to change as a function of time at least one of a detected frequency, a detected frequency spectrum and a detected intensity.

24. The device of claim 15, wherein the third arrangement includes a filter installed in front of at least one of the at least one image detector, the at least one image detector including at least one of a sensor chip, a CCD camera, in particular, and the filter includes includes one of a rotating gray filter, a rotating color filter, and a rotating polarization filter having an upstream polarizer.

* * * * *

UNITED STATES PATENT AND TRADEMARK OFFICE
CERTIFICATE OF CORRECTION

PATENT NO. : 6,642,999 B2
DATED : November 4, 2003
INVENTOR(S) : Stefan Arndt et al.

It is certified that error appears in the above-identified patent and that said Letters Patent is hereby corrected as shown below:

Title page,
Item [57], ABSTRACT,
Lines 13-14, change "changed by an as a function of time." to -- changed as a function of time. --

Column 2
Line 67, change "planes, that may," to -- planes that may be --

Column 4,
Line 32, change "two-dimensional-images" to -- two-dimensional images --
Line 40, change "where, varying intensities" to -- where varying intensities --
Lines 53-57, change "In addition to...detected frequency specturm" to -- In addition to the aforementioned high-frequency exposure of one or more sensors, each individual sensor, may use a time-dependent, for example, electronic modulation of the spectral sensitivity or of the integral sensitivity over the entire detected frequency spectrum. --

Column 7,
Line 4, change "a exemplary method" to -- an exemplary method --

Signed and Sealed this

Twenty-sixth Day of July, 2005

JON W. DUDAS
*Director of the United States Patent and Trademark Office*